United States Patent [19]

Doi et al.

[11] Patent Number: 4,970,665
[45] Date of Patent: Nov. 13, 1990

[54] METHOD AND APPARATUS FOR FORMATTING DOCUMENT

[75] Inventors: Miwako Doi; Isamu Iwai, both of Kawasaki; Yoichi Takebayashi, Yokohama; Mika Fukui, Yokohama; Koji Yamaguchi, Yokohama, all of Japan

[73] Assignee: Kabushiki Kaisha Toshiba, Kawasaki, Japan

[21] Appl. No.: 293,127

[22] Filed: Jan. 3, 1989

[30] Foreign Application Priority Data

Jan. 11, 1988 [JP] Japan ................................. 63-002565

[51] Int. Cl.$^5$ ............................................. G06F 15/00
[52] U.S. Cl. ..................................... 364/521; 364/200
[58] Field of Search .............................. 364/518–523, 364/225.6, 226, 226.1, 300; 400/61, 62, 67; 346/154

[56] References Cited

U.S. PATENT DOCUMENTS 4,086,660  4/1978  McBride ............................... 400/62
4,580,218  4/1986  Raye .................................... 364/300

Primary Examiner—Arthur G. Evans
Attorney, Agent, or Firm—Foley & Lardner, Schwartz, Jeffery, Schwaab, Mack, Blumenthal & Evans

[57] ABSTRACT

A method for formatting document in which document data and format data are given independently and in which these data can be managed very efficiently. The method includes the steps of (a) entering document data representing a document to be formatted having a title; (b) identifying a subject field to which the document belongs by searching a key work characterizing the subject field; and (c) formatting the document in one of plurality of different types of format prescribed in accordance with the identified subject field. An apparatus for performing this method is also disclosed.

5 Claims, 11 Drawing Sheets

DOCUMENT STRUCTURE COMPREHENSION SYSTEM ○

TARO OHKAWA ○

1 INTRODUCTION

This invention is ....

PRIOR ART

In this field, conventionally ....

| SUBJECT FIELD | KEY WORDS |
|---|---|
| TECHNICAL | INTRODUCTION<br>SUMMARY<br>PREFACE |
| BUSINESS | INVITATION<br>DATE / TIME<br>LOCATION |

FIG. 7(A)

FRAME SECTION

| FRAME NO. | OUTPUT POSITION | X-WIDTH | Y-WIDTH | ATTRIBUTE |
|---|---|---|---|---|
| 1 | X1, Y1 | WX 1 | WY 2 | Title/author |
| 2 | X2, Y2 | WX 2 | WY 2 | Cindex/paragraph |
| 3 | X3, Y3 | WX 3 | WY 3 | |

FIG. 7(B)

DATA SECTION

| | | | | |
|---|---|---|---|---|
| title | : | $\it{lf}$ . Ce . | | |
| author | : | $\it{lf}$ . Ce . | ds:1 | |
| cindex | : | $\it{lf}$ . $\it{ls}$:1 . | us:1 . | ds:1 |
| pindex | : | $\it{lf}$ . $\it{ls}$:3 . | us:1 | |
| paragraph | : | $\it{lf}$ . $\it{ls}$:1 | | |
| item | : | $\it{lf}$ . $\it{ls}$:4 | | |
| lparagraph | : | $\it{lf}$ . $\it{ls}$:4 | | |

FIG. 7(C)

FRAME SECTION

| FRAME NO. | OUTPUT POSITION | X-WIDTH | Y-WIDTH | ATTRIBUTE |
|---|---|---|---|---|
| 1 | X4,Y4 | WX4 | WY4 | |

FIG. 7(D)

DATA SECTION

| | | |
|---|---|---|
| date | ; ℓf, | rg |
| toad | ; ℓf, | rg |
| frad | ; ℓf, | le |

| DOCUMENT TITLE | DOCUMENT A |
|---|---|
| GRAPHIC LABEL | GRAPH P |
|  | GRAPH Q |
|  | GRAPH R |
| FORMAT TYPE | CONFERENCE A |

METHOD AND APPARATUS FOR FORMATTING DOCUMENT

BACKGROUND OF THE INVENTION

1. Field of the Invention

The present invention relates to a method and an apparatus for formatting a document in accordance with document data and format data.

2. Description of the Background Art

There are known methods of formatting document data such as 'Roff' in which format data necessary for carrying out formatting are incorporated in the document data. In such a method, it may be necessary to change the format data incorporated in the document data in order, for example, to change the number of the blank lines between headings and paragraphs that follow. Such a change in the format data has to be made at each appearance of the heading, so that corrections of this kind can become very time-consuming and inconsistency due to overlooking happens very often.

To cope with this situation, the formatting system 'Scribe' has been proposed in which the document data and the format data are given independently, so that a single change in the format data concerning the spacing between the headings and the paragraphs suffices for this type of correction to be made over the entire document. Also, by using different types of format data, the same document can be formatted in various manners in this formatting system 'Scribe'.

However, in a formatting of this kind, the management of data becomes complicated because the document data and format data are independently given. Namely, which one of various format data has been used in formatting particular document data can easily be forgotten by the time corrections have to be made, so it becomes necessary to try out each of various format data one by one in order to find the right one.

SUMMARY OF THE INVENTION

It is therefore an object of the present invention to provide a method and an apparatus for formatting a document in which document data and format data are given independently and in which these data can be managed more efficiently.

According to one aspect of the present invention there is provided an apparatus for formatting document, comprising: input means for allowing a user to enter document data representing a document to be formatted having a title; means for identifying a subject field to which the document belongs by searching a key word characterizing the subject field; and means for formatting the document in one of plurality of different types of format prescribed in accordance with the identified subject field.

According to another aspect of the present invention there is provided a method for formatting document, comprising the steps of: (a) entering document data representing a document to be formatted having a title; (b) identifying a subject field to which the document belongs by searching a key word characterizing the subject field; and (c) formatting the document in one of plurality of different types of format prescribed in accordance with the identified subject field.

Other features and advantages of the present invention will become apparent from the following description taken in conjunction with the accompanying drawings.

DETAILED DESCRIPTION OF THE PREFERRED EMBODIMENTS

Figure 1:
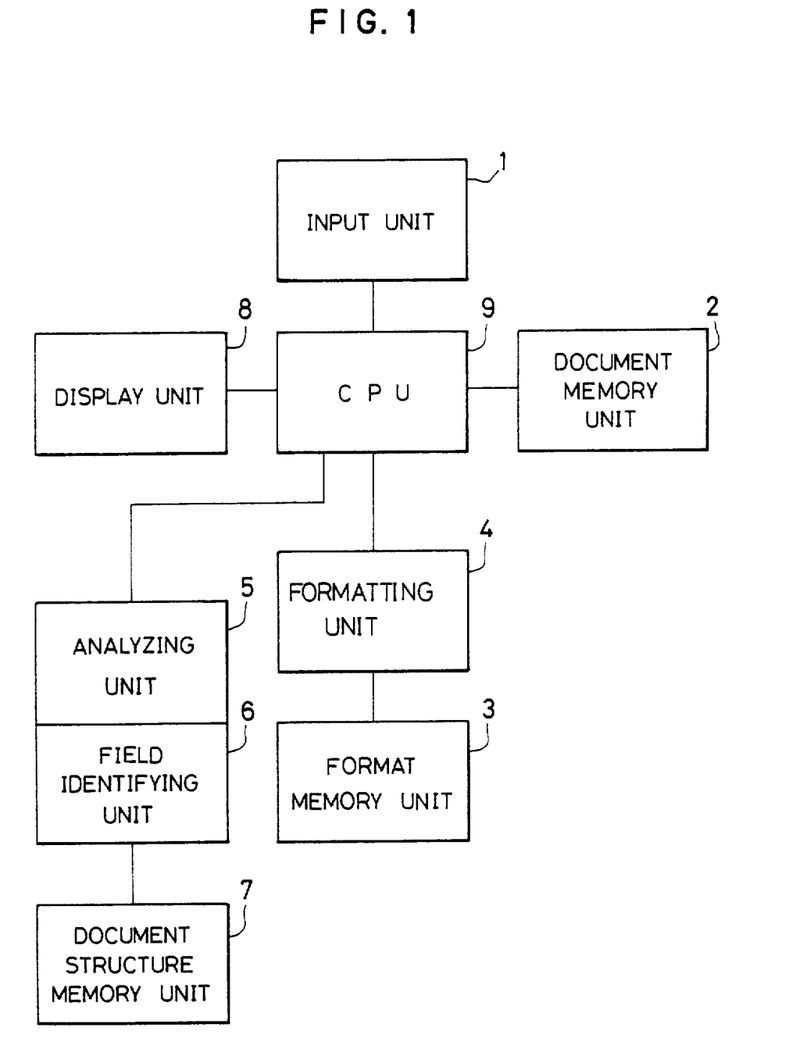
FIG. 1 is a schematic block diagram of a document formatting apparatus according to the present invention.

Referring now to FIG. 1, there is shown one embodiment of a document formatting system according to the present invention.

This document formatting system comprises an input unit 1 from which document data to be formatted and various commands for formatting are entered by a user, a document memory unit 2 for memorizing the document data entered at the input unit 1 as well as formatted document data after the formatting process is done, a format memory unit 3 for memorizing various formats with which the formatting of the document is to be carried out, a formatting unit 4 for performing the formatting of the document, an analyzing unit 5 for analyzing structures of the document, a field identifying unit 6 for automatically identifying a subject field to which the document belongs, a document structure memory unit 7 for memorizing structures of the document obtained by the analyzing unit 5, a display unit 8 for showing the document being formatted, and a CPU 9 for interconnecting and controlling all components of this document formatting system.

Figure 2:
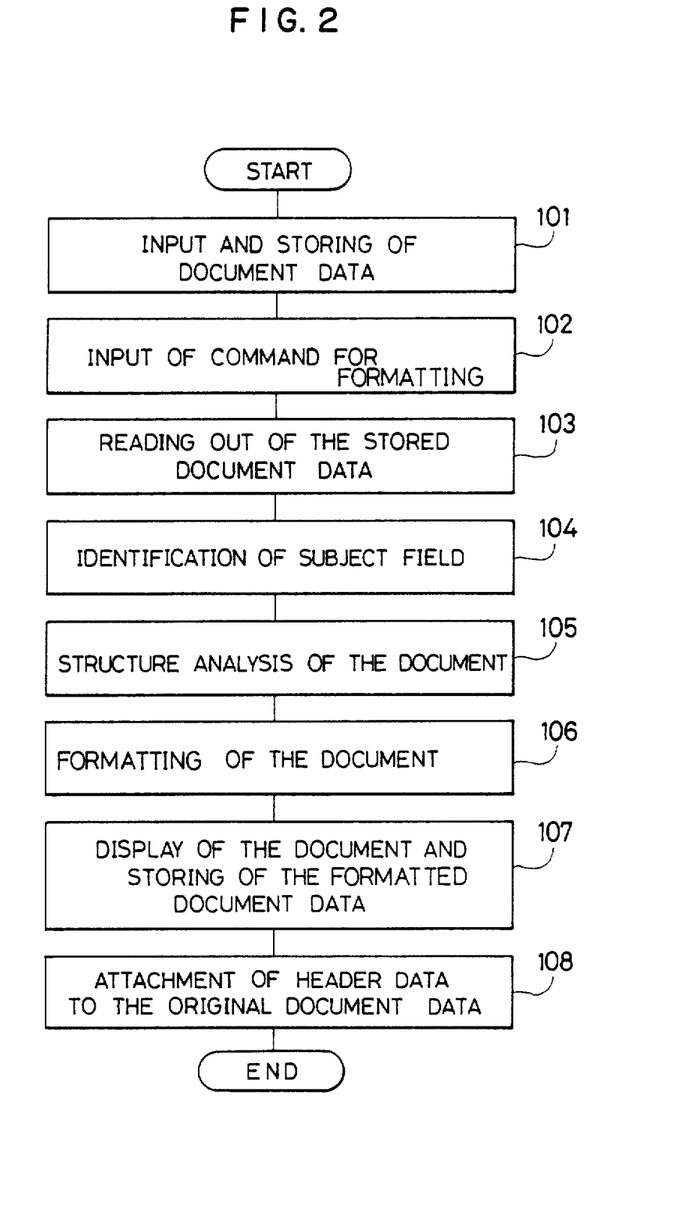
FIG. 2 is a main flow chart for the operation of the document formatting apparatus shown in FIG. 1.

Referring now to FIG. 2, the operation of this document formatting system will be explained, using an example of formatting a particular document, with subsidiary references to FIGS. 3 to 9.

Figure 3:
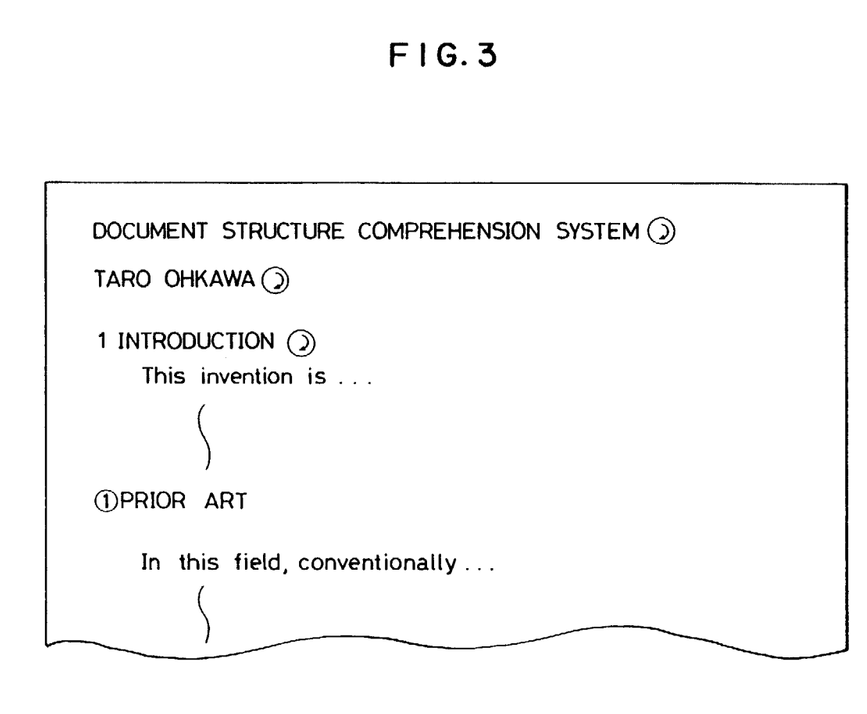
FIG. 3 is an illustration of an example of a document to be formatted used in the explanation of the operation of the document formatting apparatus shown in FIG. 1.
Figure 4:
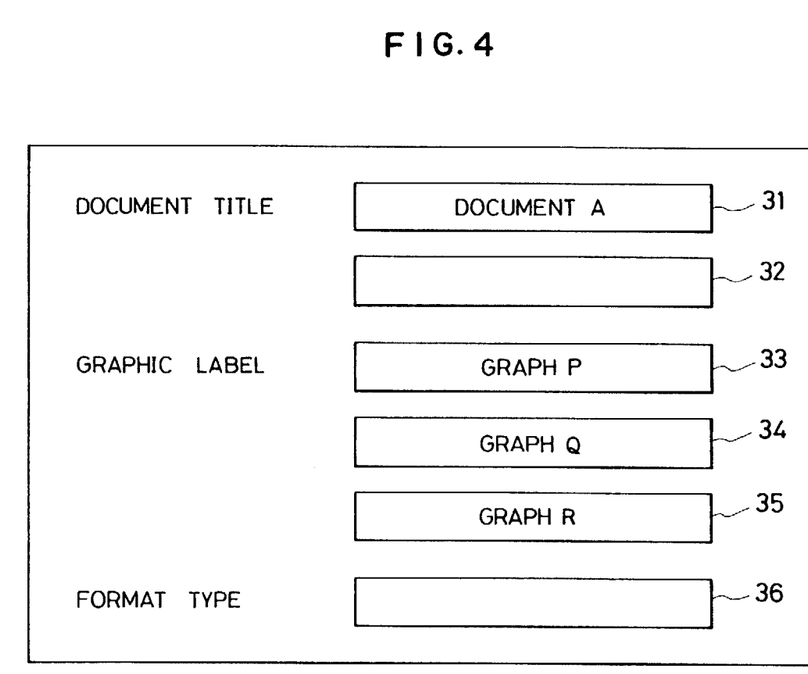
FIG. 4 is an illustration of an initial display by the display unit of the document formatting apparatus shown in FIG. 1.

At the step 101, the document data of a document 'DOCUMENT A' shown in FIG. 3 are entered at the input unit 1, and are stored in the document memory unit 2. Next, at the step 102, commands for formatting the document data are entered at the input unit 1 by the user. This is done as follows. An initial display by the display unit 8 appears as shown in FIG. 4. The user is asked to enter a title of the document to be formatted into spaces 31 and 32, labels of graphics to be incorporated in the document into spaces 33 to 35, and a type of format with which the document is to be formatted into a space 36. The format type can be selected automatically by the document formatting system at the beginning of the formatting, in accordance with the subject field identified by the field identifying unit 6, when the space 36 is left blank. Then at the step 103, the CPU 9 reads out the document data of the document 'DOCUMENT A' from the document memory unit 2, in accordance with the commands shown in FIG. 4, and gives them to the field identifying unit 6.

At the step 104, a subject field to which the document belongs is automatically identified by the field identifying unit 6. The field identifying unit 6 accomplishes this task by searching a word in the document that is listed in a key word dictionary shown in FIG. 5 which enumerates various terms that can serve as a key word for different subject fields, installed in the field identifying unit 6 itself. Thus, 'DOCUMENT A' of FIG. 3 will be identified as a technical document because of the presence of a word 'introduction' which is one of key words for technical documents according to the key word dictionary of FIG. 5.

Figure 5:
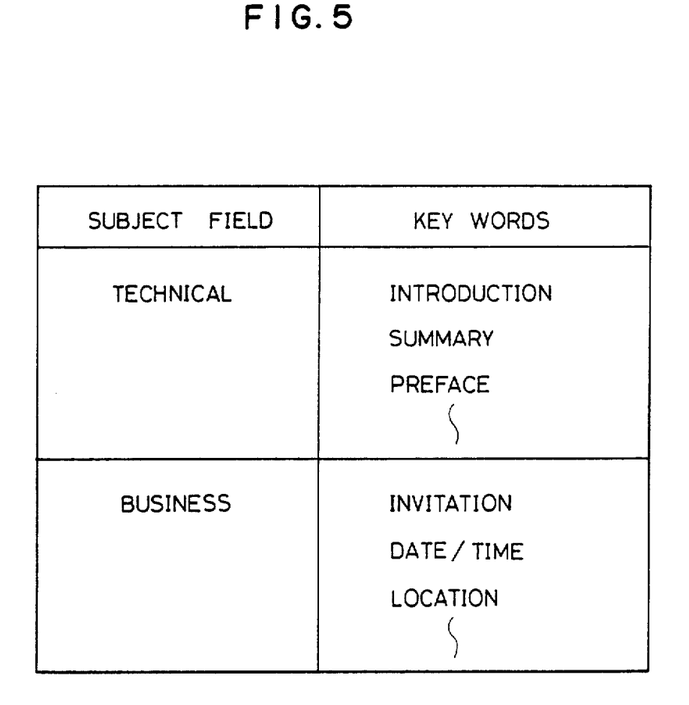
FIG. 5 is a diagrammatic illustration of a key word dictionary to be utilized by a field identifying unit of the document formatting apparatus shown in FIG. 1.
Figures 6, 6A:
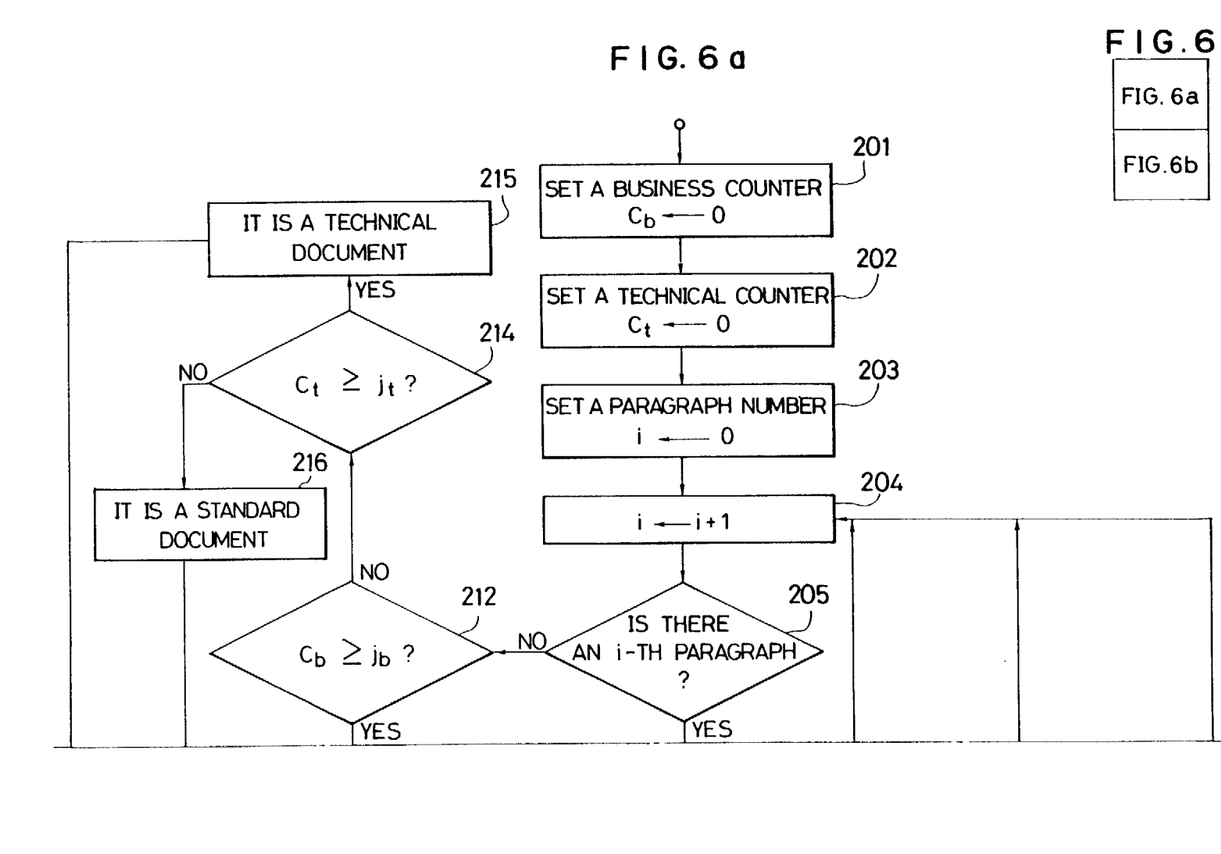
FIG. 6 is a flow chart for the operation of the field identifying unit of the document formatting apparatus shown in FIG. 1.
Figure 6B:
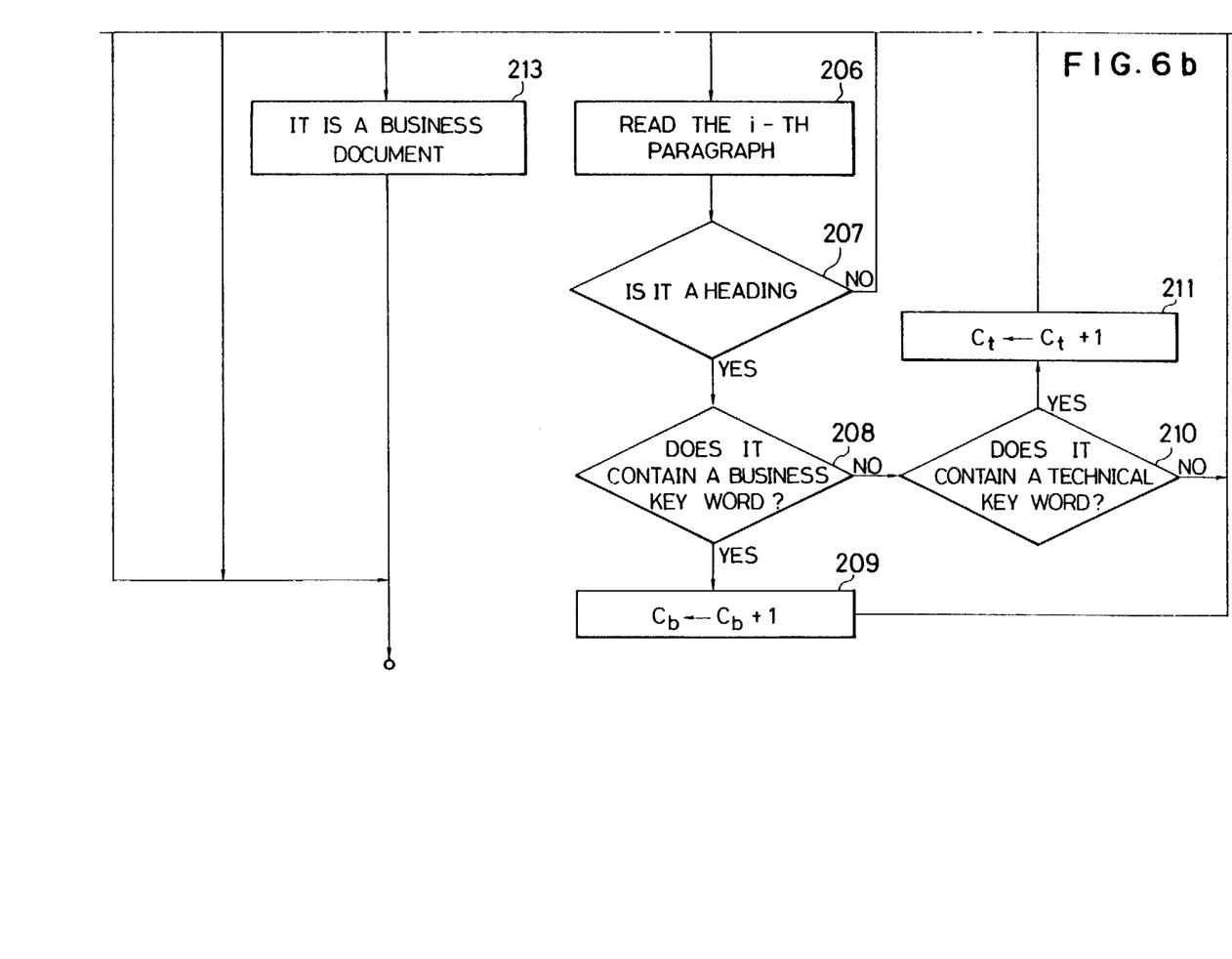
Figure 7A:
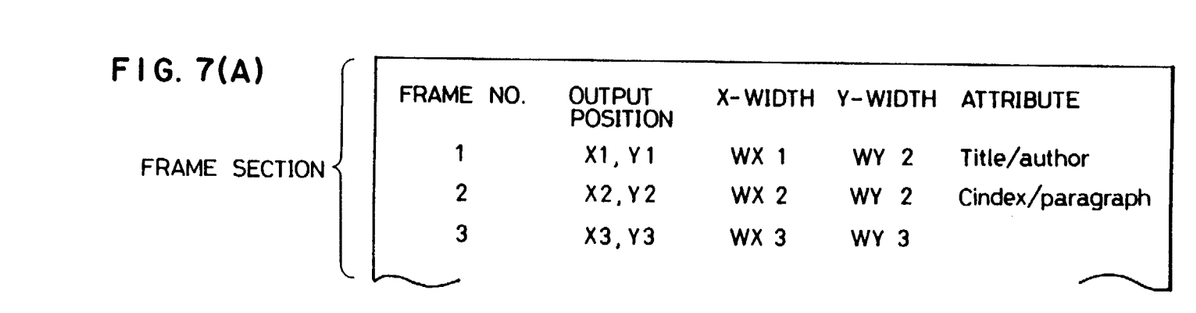
FIGS. 7(A) and (B), 7(C) and 7(D) are diagrammatic illustrations of format data stored in a format memory unit of the document formatting apparatus shown in FIG. 1.
Figure 7B:
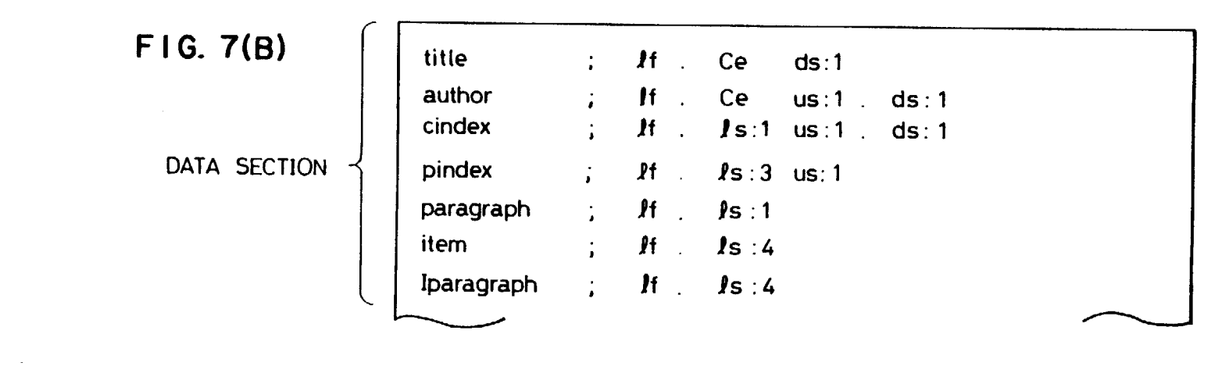
Figure 7C:
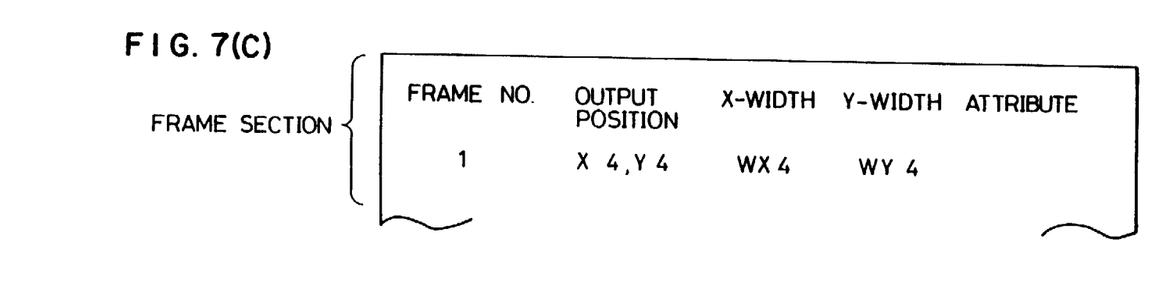
Figure 7D:
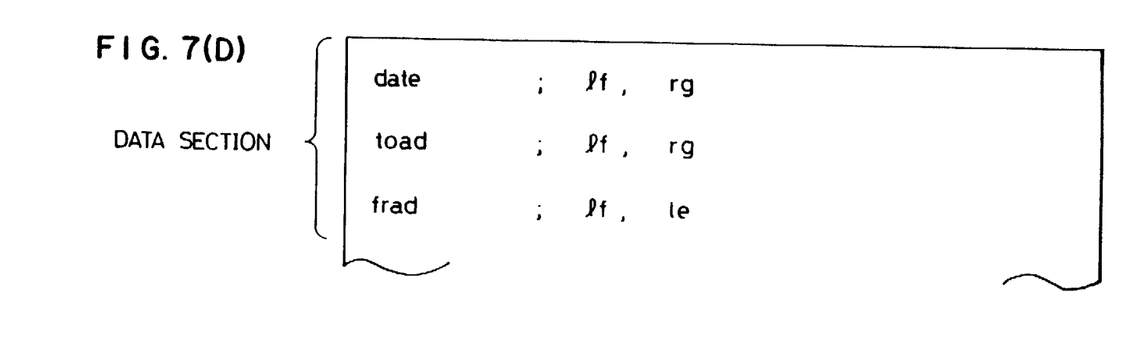

This process is shown in a flow chart of FIG. 6. Namely, at the step 201 a business counter $C_b$ is set equal to zero, at the step 202 a technical counter $C_t$ is set equal to zero, and at the step 203 a paragraph number i is set equal to zero. Then at the step 204, the paragraph number i is made to be equal to (i+1), and at the step 205, an i-th paragraph of the document is searched. When the i-th paragraph exists, the process proceeds to the step 206, whereas when the i-th paragraph does not exist, the process proceeds to the step 212. In the former case, the i-th paragraph is read out at the step 206, and whether it is a heading is determined at the step 207. When the i-th paragraph is a heading the process proceeds to the step 208, whereas otherwise the process returns to the step 204 and the steps following that step are repeated. In the former case, the presence in the i-th paragraph of any one of business key words listed in the key word dictionary of FIG. 5 is detected. When such a business key word is present in the i-th paragraph, the process proceeds to the step 209 in which the business counter $C_b$ is made to be equal to $(C_b+1)$ and then the process returns to the step 204 and the steps following that step are repeated, whereas otherwise the process proceeds to the step 210. In the latter case, at the step 210 the presence in the i-th paragraph of any one of technical key words listed in the key word dictionary of FIG. 5 is detected. When such a technical key word is present in the i-th paragraph, the process proceeds to the step 211 in which the technical counter $C_t$ is made to be equal to $(C_t+1)$ and then the process returns to the step 204 and the steps following that step are repeated.

On the other hand, when the i-th paragraph is found to be absent at the step 205, the process proceeds to the step 212 in which the number indicated by the business counter $C_b$ is compared with a prescribed business threshold number $j_b$. When the number indicated by the business counter $C_b$ is greater than the prescribed business threshold number $j_b$, the process proceeds to the step 213 in which the document is identified as a business document, and the process terminates. Otherwise, the process proceeds to the step 214 in which the number indicated by the technical counter $C_t$ is compared with a prescribed technical threshold number $j_t$. When the number indicated by the technical counter $C_t$ is greater than the prescribed technical threshold number $j_t$, the process proceeds to the step 215 in which the document is identified as a technical document and the process terminates, whereas otherwise the process proceeds to the step 216 in which the document is identified as a standard document and the process terminates.

Next, at the step 105, the analyzing unit 5 analyzes the structure of the document in accordance with the identified subject field of the document, by utilizing possible document structures pertinent to this subject field. This can be accomplished in a known method such as that disclosed in U.S. patent application Ser. No. 897,930, in which the detail explanation can be found. The result of this analysis is stored in the document structure memory unit 7.

Figure 8:
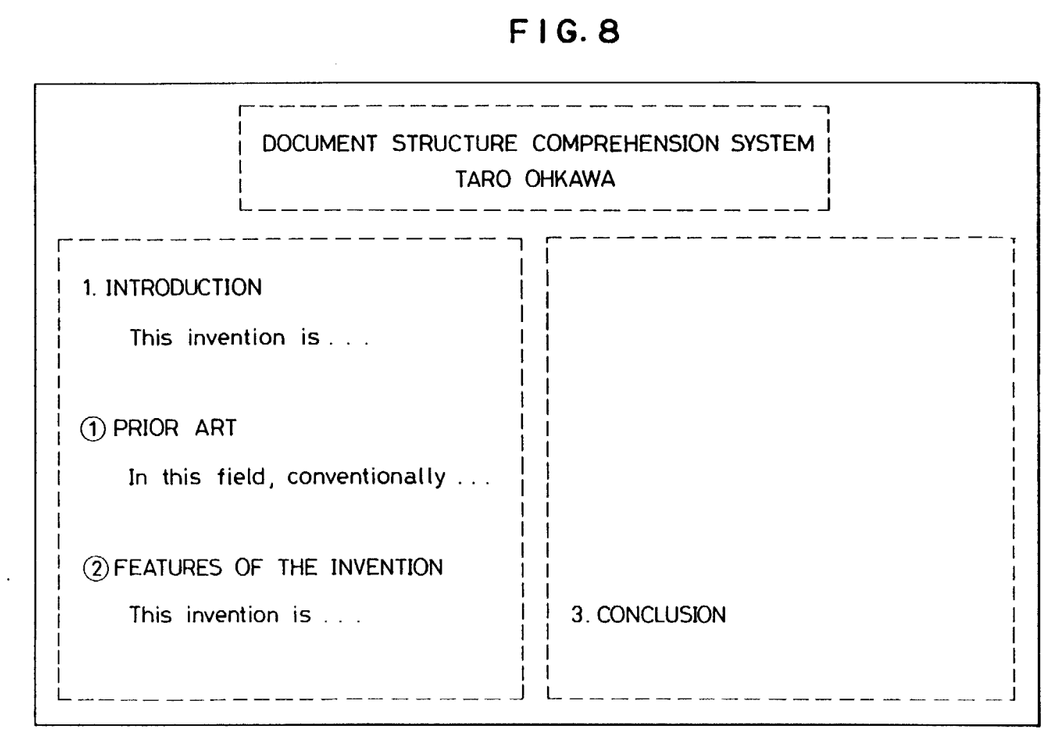
FIG. 8 is an illustration of a formatted output resulting from the document shown in FIG. 3.

Then, at the step 106, the document data are formatted in accordance with the analyzed structure of the document stored in the document structure memory unit 7, using a format data from the format memory unit 3 corresponding to the type of format specified at the step 102. In this embodiment, the format memory unit 3 has format data for a technical document data shown in FIGS. 7(A) and (B) which will be referred as a format 'CONFERENCE A' in the following and format data for a business document data shown in FIGS. 7(B), 7(C) and (D). In both of these, the format data is comprised of two sections. A frame section has a plurality of entries called frames, one for each element constituting the document, and contains information regarding layout of the different elements of the document in terms of output position, x-width, y-width, and attribute. Here, the output position indicates a starting point of each element, x- and y- width indicate spatial extension required by each element in x- and y- directions, respectively, and attribute indicates a classifying name given to each element according to its structural function. A data section has a plurality of entries also called frames, one for each classifying name, and contains indications of appropriate format for each element to be laid out. The document 'DOCUMENT A' will be formatted according to the format 'CONFERENCE A' of FIGS. 7(A) and (B), as it is a technical document. The resulting document which appears as shown in FIG. 8 is then displayed by the display unit 8, and the formatted document data are stored back in the document memory unit 2 at the step 107.

Figure 9:
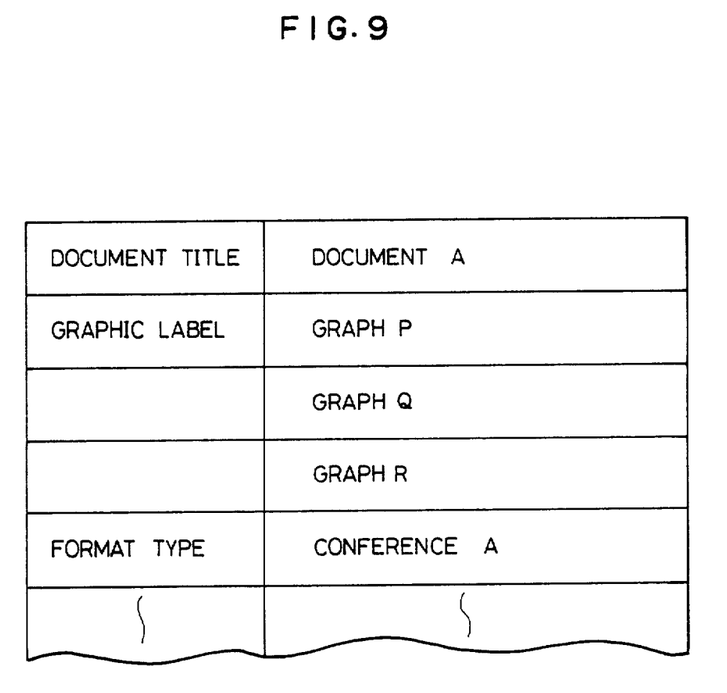
FIG. 9 is a diagrammatic illustration of header data to be attached to document data by the document formatting apparatus shown in FIG. 1.

Next, at the step 108, the CPU 9 creates a header data containing the document title, the relevant graphic labels, and the format type used, as shown in FIG. 9, and attaches this header data to the original document data stored in the document memory unit 2 as a header of the document data.

As a result, the next time the command for formatting the document 'DOCUMENT A' is given by the user, information concerning the format with which the document was formatted last time as well as the relevant graphic labels can be instantaneously recalled from the header data attached to the document data for 'DOCUMENT A', so that the user can be relieved not only from remembering such information but also from giving the same command over and over again.

It is to be noted that the header data shown in FIG. 9 may have either a fixed number of entries or a variable number of entries which can be varied in accordance with necessity.

It is also to be noted that although in the above embodiment the header data are attached to the original document data, it may be attached to the formatted document data without losing the distinct advantages of the present invention.

Besides these, many modifications and variations of this embodiment may be made without departing from the novel and advantageous features of the present invention. Accordingly, all such modifications and variations are intended to be included within the scope of the appended claims.

What is claimed is:

1. An apparatus for formatting a document, comprising:
   input means for allowing a user to enter document data representing a document to be formatted having a title;
   means for identifying a subject field to which the document belongs by searching a key word characterizing the subject field; and
   means for formatting the document in one of a plurality of different types of format prescribed in accordance with the identified subject field.

2. The apparatus of claim 1, further comprising means for attaching information containing the title of the document and the type of format with which the document is formatted by the formatting means, to the document data.

3. The apparatus of claim 2, wherein the input means also allows the user to enter a command which specifies the type of format with which the document is to be formatted, and wherein the formatting means formats the document using the format specified by the command.

4. The apparatus of claim 3, wherein the formatting means selects an appropriate format with which to format the document in accordance with the subject field identified by the identifying means when the command is not entered by the user.

5. The apparatus of claim 2, further comprising means for analyzing logical structure of the document in terms of logical functions of different parts of the document in accordance with the subject field identified by the identifying means, and wherein the formatting means formats the document in accordance with the analyzed logical structure.

* * * * *